(12) United States Patent
Fonseca Ocampos et al.

(10) Patent No.: US 9,896,903 B2
(45) Date of Patent: Feb. 20, 2018

(54) METHODS OF MAKING AND USING CEMENT COATED SUBSTRATE

(71) Applicant: Shell Oil Company, Houston, TX (US)

(72) Inventors: Ernesto Rafael Fonseca Ocampos, Houston, TX (US); Mauricio Jose Farinas Moya, Houston, TX (US); Guy Lode Magda Maria Verbist, Amsterdam (NL); Gerardus Johannes Leonardus Van Der Wegen, Sittard (NL); Henricus Lambertus Maria Van Selst, Sittard (NL); Cornelis Pieter Hamelink, Amsterdam (NL); Robertus Hermannes Johannes Jozef Haverkort, Ulestraten (NL); Jochem Okke Boer, Amsterdam (NL); Jeffrey Maloy Noe, Houston, TX (US); Jesper Van Der Horst, Amsterdam (NL); Peter Liam Brett, Houston, TX (US); Claudia Jane Hackbarth, Bellaire, TX (US); Prasad Baloo Kerkar, Houston, TX (US); Benjamin Mowad, Houston, TX (US)

(73) Assignee: SHELL OIL COMPANY, Houston, TX (US)

(*) Notice: Subject to any disclaimer, the term of this patent is extended or adjusted under 35 U.S.C. 154(b) by 0 days.

(21) Appl. No.: 14/716,504

(22) Filed: May 19, 2015

(65) Prior Publication Data
US 2015/0337620 A1    Nov. 26, 2015

Related U.S. Application Data

(60) Provisional application No. 62/001,443, filed on May 21, 2014.

(51) Int. Cl.
*E21B 33/138* (2006.01)
*E21B 43/267* (2006.01)
(Continued)

(52) U.S. Cl.
CPC ........ *E21B 33/138* (2013.01); *C04B 20/1077* (2013.01); *C04B 30/00* (2013.01);
(Continued)

(58) Field of Classification Search
None
See application file for complete search history.

(56) References Cited

U.S. PATENT DOCUMENTS 2,223,804 A    12/1940    Kennedy
2,805,721 A     9/1957    Maly
(Continued)

FOREIGN PATENT DOCUMENTS

CN    101407390    4/2009
DE    102009008451    2/2010
(Continued)

OTHER PUBLICATIONS

PCT International Search Report, Application No. PCT/US2013/046767 dated Feb. 14, 2014.

*Primary Examiner* — Anuradha Ahuja

(57) ABSTRACT

A method of treating a subterranean formation via well bore may include introducing a plurality of particles into the subterranean formation via the well bore, each particle having a substrate and a layer of cement on the substrate. The cement may be in a state of suspended hydration and the method may include introducing moisture to the subterranean formation via the well bore. The method may also include allowing the particles and the moisture to contact one another. Contact between the particles and the moisture
(Continued)

may cause the cement to move from a state of suspended hydration to a state of secondary hydration.

8 Claims, 4 Drawing Sheets

(51) Int. Cl.
    *C09K 8/46*     (2006.01)
    *C09K 8/57*     (2006.01)
    *C09K 8/80*     (2006.01)
    *C09K 8/467*     (2006.01)
    *E21B 43/26*     (2006.01)
    *C04B 30/00*     (2006.01)
    *C04B 20/10*     (2006.01)

(52) U.S. Cl.
    CPC ............... *C09K 8/46* (2013.01); *C09K 8/467* (2013.01); *C09K 8/57* (2013.01); *C09K 8/80* (2013.01); *C09K 8/805* (2013.01); *E21B 43/26* (2013.01); *E21B 43/267* (2013.01)

(56) References Cited

U.S. PATENT DOCUMENTS

| | | | | |
|---|---|---|---|---|
| 2,933,135 | A * | 4/1960 | Johnson | C09K 8/502 166/283 |
| 3,145,774 | A * | 8/1964 | Patchen | C04B 24/16 106/662 |
| 3,399,727 | A | 9/1968 | Graham et al. | |
| 3,654,991 | A * | 4/1972 | Harnsberger | E21B 43/261 166/281 |
| 3,654,992 | A | 4/1972 | Harnsberger et al. | |
| 3,862,663 | A | 1/1975 | Curtice et al. | |
| 3,869,295 | A * | 3/1975 | Bowles | C04B 20/1055 264/54 |
| 3,948,672 | A | 4/1976 | Harnsberger | |
| 4,023,955 | A * | 5/1977 | Mueller | C05C 9/00 427/214 |
| 4,358,047 | A | 11/1982 | Raubenheimer | |
| 5,273,115 | A | 12/1993 | Spafford | |
| 5,814,146 | A * | 9/1998 | Maggio | C04B 20/0048 106/634 |
| 5,897,704 | A | 4/1999 | Baglin | |
| 5,948,734 | A | 9/1999 | Sinclair et al. | |
| 6,202,751 | B1 | 3/2001 | Chatterji et al. | |
| 6,330,916 | B1 | 12/2001 | Rickards et al. | |
| 6,364,018 | B1 * | 4/2002 | Brannon | C09K 8/68 166/280.2 |
| 6,508,305 | B1 * | 1/2003 | Brannon | C04B 16/04 106/607 |
| 6,662,873 | B1 | 12/2003 | Nguyen et al. | |
| 6,883,609 | B2 | 4/2005 | Drochon et al. | |
| 6,938,692 | B2 | 9/2005 | Nguyen et al. | |
| 7,032,663 | B2 | 4/2006 | Nguyen | |
| 7,044,224 | B2 | 5/2006 | Nguyen | |
| 7,267,171 | B2 * | 9/2007 | Dusterhoft | C09K 8/62 166/280.1 |
| 7,717,176 | B2 | 5/2010 | Danican et al. | |
| 7,851,415 | B2 * | 12/2010 | Nelson | C04B 20/1029 166/278 |
| 7,861,780 | B2 | 1/2011 | Stephenson et al. | |
| 2002/0048676 | A1 * | 4/2002 | McDaniel | A63K 1/00 428/404 |
| 2003/0089281 | A1 * | 5/2003 | Berke | C04B 7/52 106/713 |
| 2004/0040708 | A1 * | 3/2004 | Stephenson | C09K 8/805 166/280.1 |
| 2005/0019574 | A1 * | 1/2005 | McCrary | C09C 3/10 428/403 |
| 2005/0028979 | A1 * | 2/2005 | Brannon | C09K 8/62 166/280.2 |
| 2005/0173117 | A1 * | 8/2005 | Roddy | C04B 18/16 166/293 |
| 2006/0065398 | A1 * | 3/2006 | Brannon | C09K 8/665 166/280.2 |
| 2006/0162926 | A1 * | 7/2006 | Roddy | C04B 18/16 166/278 |
| 2006/0166834 | A1 * | 7/2006 | Roddy | C04B 18/021 507/140 |
| 2006/0169448 | A1 | 8/2006 | Savery et al. | |
| 2007/0204992 | A1 * | 9/2007 | Davis | C09K 8/80 166/280.2 |
| 2008/0135245 | A1 | 6/2008 | Smith et al. | |
| 2008/0217010 | A1 | 9/2008 | Blackburn et al. | |
| 2008/0234146 | A1 * | 9/2008 | Barmatov | C09K 8/805 507/203 |
| 2009/0139719 | A1 * | 6/2009 | Luo | C04B 18/021 166/280.2 |
| 2010/0071901 | A1 * | 3/2010 | Luo | C09K 8/80 166/280.2 |
| 2011/0083850 | A1 * | 4/2011 | Barmatov | C09K 8/80 166/280.1 |
| 2013/0233545 | A1 * | 9/2013 | Mahoney | C09K 8/80 166/280.2 |
| 2014/0014348 | A1 * | 1/2014 | Mahoney | C09K 8/805 166/308.2 |
| 2014/0262295 | A1 | 9/2014 | Aines et al. | |

FOREIGN PATENT DOCUMENTS

| | | |
|---|---|---|
| SI | 20873 | 10/2002 |
| WO | WO2011081550 | 7/2011 |

* cited by examiner

METHODS OF MAKING AND USING CEMENT COATED SUBSTRATE

RELATED APPLICATIONS

This application claims priority to U.S. provisional application No. 62/001,443, filed on May 21, 2014, the contents of which are incorporated herein by reference.

FIELD OF THE INVENTION

The invention relates to particles for use in a subterranean formation. More specifically, the invention relates to particles formed of a substrate and a cement and methods of making and using such particles.

BACKGROUND

Hydrocarbons are generally produced by drilling a hole into the ground such that a well bore is formed providing a path from the surface of the earth into the rock below. Various features below the surface make up the subterranean formation in which oil or other hydrocarbons may be located. Fracturing operations are commonly utilized to provide enhanced hydrocarbon production from the subterranean formation. During such fracturing operations, cracks or fractures are initiated from the well bore into the subterranean formation and the fractures are frequently propped open with small particles called proppant which allow hydrocarbons to flow out of the formation without closure of the fractures. Sand is one commonly used proppant. However, sand has relatively poor resistance to high stress, resulting in generation of fines, loss of fracture conductivity and ultimately low recovery of the hydrocarbons in the formation. Alternatives to sand, such as ceramic or sintered bauxite may provide a stronger proppant with better stress resistance but tend to be much more expensive and are commonly prohibited in unconventional gas and tight oil exploitation.

Many proppants are placed in the formation in conjunction with a carrier polymer (linear or cross-linked). After placement, the polymer "breaks" thus allowing fluids to pass between the particles of the proppant pack. The breaking may be achieved via chemicals. However, when formation permeability is low, it can take some time for the fracture to close (fracture closure time). Thus, it can be challenging to select a chemical to dissolve the carrier polymer without damage in onshore hydrocarbon projects. Thus, reduction of water or other fracturing fluids present in the flow-back, or initial production, will help in the cleanup of the proppant pack by reduction of proppant carried by this water or fracturing fluids into the wellbore.

Currently, strong proppants tend to embed in the surface of the fracture, or fracture face of the formation. In particular, in onshore hydrocarbon projects, proppants such as ceramics tend to become embedded in the shale fracture face. Embedment in the formation can cause reduction in effective fracture width because part of the proppant can become part of the fracture face. Unresolved embedment can decrease fracture conductivity and thus, recovery of hydrocarbons.

Finally, proppants, if not properly held together inside the fracture, can flow back into the well, causing well obstructions over time and increasing operating costs. The occurrence of this phenomenon may be driven by a combination of factors such as rock type, stress contrast and completion type. Commonly the industry addresses this problem by adding a resin coating to proppants (ceramics and/or sands) to provide bondage between the particles. This (resin coating) is an expensive solution that can double or triple the overall spend on proppant material.

SUMMARY

A particle may include a substrate and a layer of cement on the substrate. The cement may be in a state of suspended hydration.

A method of treating a subterranean formation via well bore may include introducing a plurality of particles into the subterranean formation via the well bore, each particle having a substrate and a layer of cement on the substrate. The cement may be in a state of suspended hydration and the method may include introducing moisture to the subterranean formation via the well bore. The method may also include allowing the particles and the moisture to contact one another. Contact between the particles and the moisture may cause the cement to move from a state of suspended hydration to a state of secondary hydration.

Another method may include providing a plurality of particles, each particle including a substrate and a layer of cement in a state of suspended hydration on the substrate. The method may include allowing moisture to contact the particles and allowing contact between the particles before the cement has substantially hardened. The method may also include maintaining contact between the particles while allowing the cement to substantially harden, causing the particles to bond together, forming an agglomerated matrix.

Yet another method may include providing a substrate, providing cement, and providing moisture. The method may include allowing contact between the cement and the moisture such that the cement enters a state of initial hydration, and contacting the substrate with the cement in the state of initial hydration, thus coating the substrate with the cement so as to form a particle. The method may include stopping hydration before the particle is placed in a load-bearing location.

DETAILED DESCRIPTION

Figure 1:
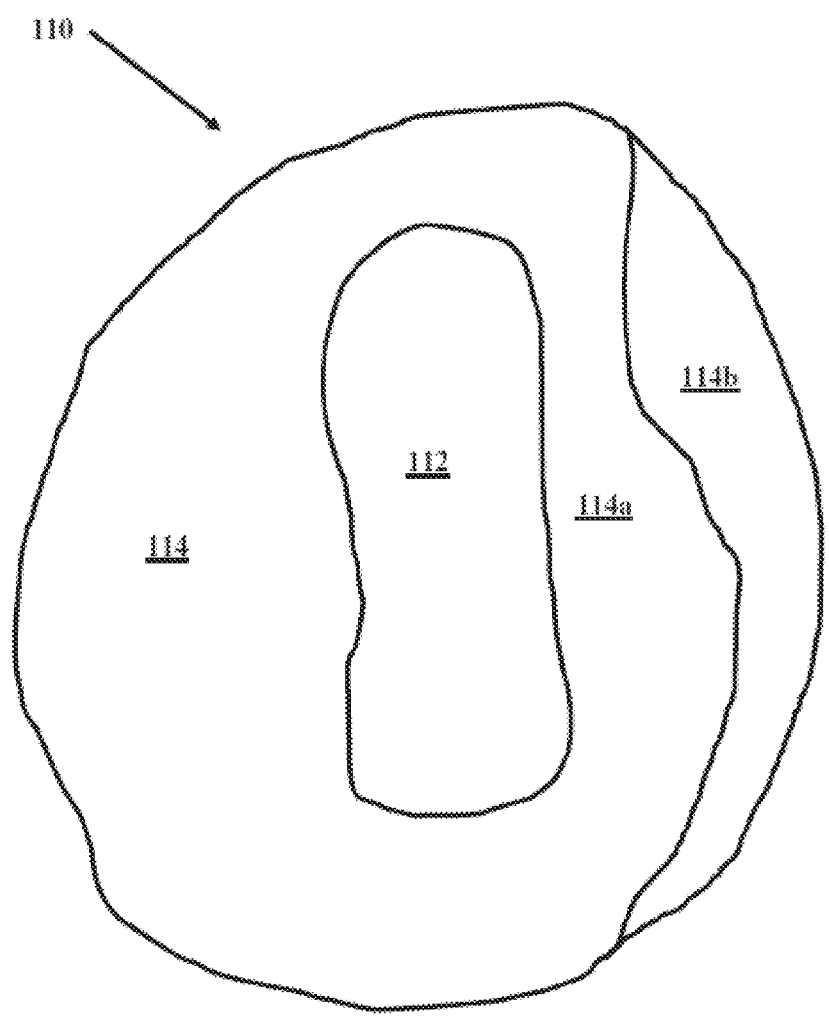
FIG. 1 illustrates a cross-sectional view of a particle formed of a substrate and a layer of cement on the substrate, in accordance with one embodiment.

The present disclosure relates to an alternative to sand proppant or other proppants currently used. As described below, a particle having an outer cement coating or outer layer in state of being hydrated (plastic) may adapt better to the fracture face, thus creating less embedment. Also, using methods described herein may provide better bonding between particles and prevent flowback problems at a lower cost than resin applications.

Generally, a particle 110 may be formed of a substrate 112 with a layer of cement 114 thereon. The cement 114 may increase crush resistance of the substrate 112, increase roundness of the particle 110, and normalize ability to sort the particle 110. The cement 114 may allow a sand particle, which is otherwise deemed unsuitable for proppant use because of inadequate strength, improper roundness, and/or poor sorting efficacy, to be used as fracture propping material, for example, to retain integrity and permeability. In some instances, this integrity and permeability may be maintained at stresses higher than 5000 psi. When the particle 110 joins with another similar particle, a corresponding matrix frame formed may allow the formation of a stable aggregate frame, which may enhance the resistance of the proppant pack to higher loads and stress cycling.

Prior to formation of the particle 110, the substrate 112 could be washed to remove impurities from surfaces of the substrate. The substrate 112 could also be processed through screens, or sieved, so that substrates of smaller or larger size than the range of sizes desired are removed.

During formation of the particle 110, the cement 114 may contain moisture when applied to the substrate 112. Thus, the cement 114 on the substrate 112 may be in a state of initial hydration when applied to the substrate 112. After the layer of cement 114 has been applied to the substrate 112, the particle 110 may be heated or otherwise dried to remove moisture from the cement 114 to quench the cement reaction and sustain bonding reactivity between particles 110.

During the drying of the particle 110 it may be desirable to provide a dust collection system to capture cement particles or other solids entrained in a drying mediums such as heated air.

The removal of moisture from the cement 114 may cause the hydration of the cement 114 to slow significantly or even stop. Thus, when sufficient moisture has been removed by drying the particle 110, the cement 114 may be in a state of suspended hydration. At this point, the cement 114 on the particle 110 may be considered partially hydrated or pre-hydrated. While the cement 114 is in the state of suspended hydration, it can be stored, transported, or otherwise handled as a dry material. Then, when desired, the particle 110 may again be exposed to moisture at which point the cement 114 may continue the hydration process, entering a state of secondary hydration. The secondary hydration may continue until the cement 114 has substantially hardened. Alternatively, the secondary hydration may be slowed or stopped for a time before entering one or more subsequent states of hydration (i.e., tertiary hydration, quaternary hydration, etc.).

Referring now to FIG. 1, the particle 110 may be spherical. For example, the particle 110 may have a sphericity higher than 0.5 or a roundness greater than 0.5. The particle 110 may have a size ranging from any of 20/40 US Mesh, 20/50 US Mesh, 30/50 US Mesh, 40/70 US Mesh, 50/70 US Mesh or 100 US Mesh. The particle 110 may have weight from 1 to 1.5 SG, from 1.3 to 1.8 SG, from 1.7 to 2.2 SG, from 2.0 to 2.5 SG, from 2.1 to 2.8 SG, from 2.7 to 3.5 SG, or from 3.2 to 3.8 SG, for example. Variations of size, shape, sorting, and weight may depend on the particular substrate 112, the particular cement 114, and the ratio of substrate 112 to cement 114 to attain desired characteristics of stickiness, strength and cost. In some embodiments, the ratio of substrate 112 to cement 114 may be from 3/1, 2/1, 1/1, or 0.5/1, either by weight or by volume. Fines generation may be less than 10% after stress cycling or API conductivity test. The particle 110 may be combined with any number of other particles to form a structure, or the particle 110 may be used without contacting other particles. In some applications, the particle 110 may be used as a proppant. When used as a proppant, the particle 110 may stick to other particles under stress and form a stable aggregate matrix frame (i.e., an agglomerated matrix) in the formation. The particles 110 may be designed to either stick together during fracture closure or to slip freely in the proppant pack as results of stress load. The particle 110 may have the ability to absorb fluid (e.g., water) from the proppant pack and may thus mitigate damage associated with fluid blockage, allowing for better conductivity when used in a fracture. The particle 110 may have ability to self-sustain within the proppant pack by bonding with the formation and/or other particles, thus potentially resulting in better placement in the fracture with less settling of the proppant. The binding structure created by the cement 114 may reduce point load creating a material that is more compatible with the stress created by production cycles. The particle 110 may be constructed of more compliant materials, behaving as a plastic solid when bonded together with other particles 110, instead of the proppant pack sustaining load concentrations on contact points. The particle 110 may have the ability to accelerate oxidizing breakers, thus allowing for more powerful gel-breaking action, resulting in cost savings for breaker. Finally, when the particles 110 form a bonded material or matrix, the production of fines and proppant back into the well bore may be reduced.

The substrate 112 may have a size ranging from any of 20/40 US Mesh, 20/50 US Mesh, 30/50 US Mesh, 40/70 US Mesh, 50/70 US Mesh or 100 US Mesh. The substrate 112 may have weight from 1 to 1.5 SG, from 1.3 to 1.8 SG, from 1.7 to 2.2 SG, from 2.0 to 2.5 SG, from 2.1 to 2.8 SG, from 2.7 to 3.5 SG, or from 3.2 to 3.8 SG, for example. Variations of size, shape, sorting, and weight may depend on the particular substrate 112, the particular cement 114, and the ratio of substrate 112 to cement 114 to attain desired characteristics of stickiness, strength and cost. Examples of suitable substrates include, but are not limited to, quartz sand (e.g., low or high angularity), sand that is a mixture of various minerals, aluminum balls, walnut shells, glass beads, plastic balls, ceramic, resin-clad sand, alumina, titanium silicates, iron oxide, light weight material (e.g., materials lighter than sand), hollow microspheres, recycled crushed concrete particles from the construction industry or other crushed concrete, fly ash, secondary raw materials, crushed glass or other glass particles, crushed rock, crushed light weight aggregates, clinker, spent catalyst (e.g., heavy metal leach), various cement types including Portland cement, micro-cement, slag and/or fly ash cement, any of the cement types and compositions mentioned in the European standard EN 197-1, including types I through V and subtypes (for example, the 7 subtypes in type II), any of the types and compositions mentioned in ASTM C150, and any of the types and compositions mentioned in ASTM C595, mineral residuals, or any other grain, granule, seed, or object suitable for being covered, at least partially, with a layer of cement. When the particle 110 is intended for use as a proppant, the substrate 112 may include any of the substrates 112 listed above, along with any of a number of conventional proppants. When the substrate 112 is a low density material, placement of the particles 110 in a fracture face may be more effective and gelled fluid may not be needed for transport, thus reducing or eliminating the potentially damaging effects of gelled fluids to the fracture. In one example, a non-proppant grade sand may be used as the substrate 112, allowing for a reduced-cost material as compared with conventional proppants.

Particles intended for use in non-fracturing operations may include the particles described above and/or particles conventionally used for applications similar to the intended application.

The cement 114 may be a mineral powder with hydraulic properties, grain densities ranging from 2.0 to 4.0 kg/l, and average particle size ranging from 0.1 micron to more than 100 micron. The cement 114 may be a coating applied as one or more layers (for example, 114a and 114b) to cover the substrate 112 at least partially. When placed on the substrate 112, the cement 114 lines, coats, or otherwise provides some degree of coverage of the substrate 112. In some applications, the cement 114 mostly, substantially, or even wholly encapsulates the substrate 112, so as to protect the substrate 112 from exposure to conditions beyond the cement 114. However, natural imperfections in coverage, or design considerations may provide for areas of reduced coverage, including areas where one or more portions of the substrate 112 are not covered by cement 114. Regardless of level of coverage, the layer of cement 114 coating the substrate 112 may be formed of multiple intermediate layers, whether distinctly separate, or formed integrally.

Ultimately, the final layer of cement 114 may have a thickness 116 of anywhere between 10 microns and 200 microns. This thickness 116 may vary across the particle 110, depending on the shape of the substrate 112, the process used to apply the cement 114 to the substrate, design considerations, or other factors. Thus, the thickness 116 may be measured as a minimum thickness, as a maximum thickness, or, preferably, as an average thickness. In some applications, the cement 114 may include Portland cement, micro-cement, slag and/or fly ash cement, clinker and any of the cement types and compositions mentioned in the European standard EN 197-1, including types I through V and subtypes (e.g., the 7 subtypes in type II), any of the types and compositions mentioned in ATSM C150, and any of the types and compositions mentioned in ASTM C595, or combinations thereof. These various types of cement or cementitious materials are classified as hydraulic material capable to react with water and form a water resistant binding material. When the particle 110 is used as a proppant, the cement 114 may be selected on properties to enhance crush resistance and allow matrix frame building when the particles 110 are kept close together. Further, the cement 114 may include glass fibers, nanotubes, or some other reinforcement, or other chemicals such as but not limited to polymers, fillers, additives, or admixtures to increase the crush resistance or binding capacity/stickiness of the particle 110.

The application of the cement 114 on the substrate 112 may occur in a number of different ways. For example, a dry mix of cement 114 and substrate 112 can be pre-hydrated with a small amount of water in order to coat the substrate 112 with a thin layer of cement 114. The mix can subsequently be pumped in an excess of water or methylcellulose as a transport medium. Pre-hydration may allow for the cement particles to be slightly bonded to the individual grains of substrate 112 while leaving enough hydration to later form a pervious bonded structure in a fracture.

Generally, one method may include providing the substrate 112, providing the cement 114, and providing moisture at a plant or other site or facility sized for such an operation. The method may include causing or otherwise allowing contact between the cement 114 and the moisture such that the cement 114 enters a state of initial hydration. During hydration, an irreversible chemical process may occur between the cement 114 and the moisture. Thus, during initial hydration, the chemical process may be started and may continue until something stops the chemical reaction from proceeding. While the cement 114 is in the state of initial hydration, the substrate 112 may be placed in contact with the cement 114. Thus, the substrate 112 may be coated with the cement 114 to form the particle 110. Once the particle 110 has been formed, but before the cement 114 has substantially hardened, the particle 110 may be dried, slowing or stopping the chemical reaction from proceeding and causing the cement 114 to enter a state of suspended hydration.

Figure 2:
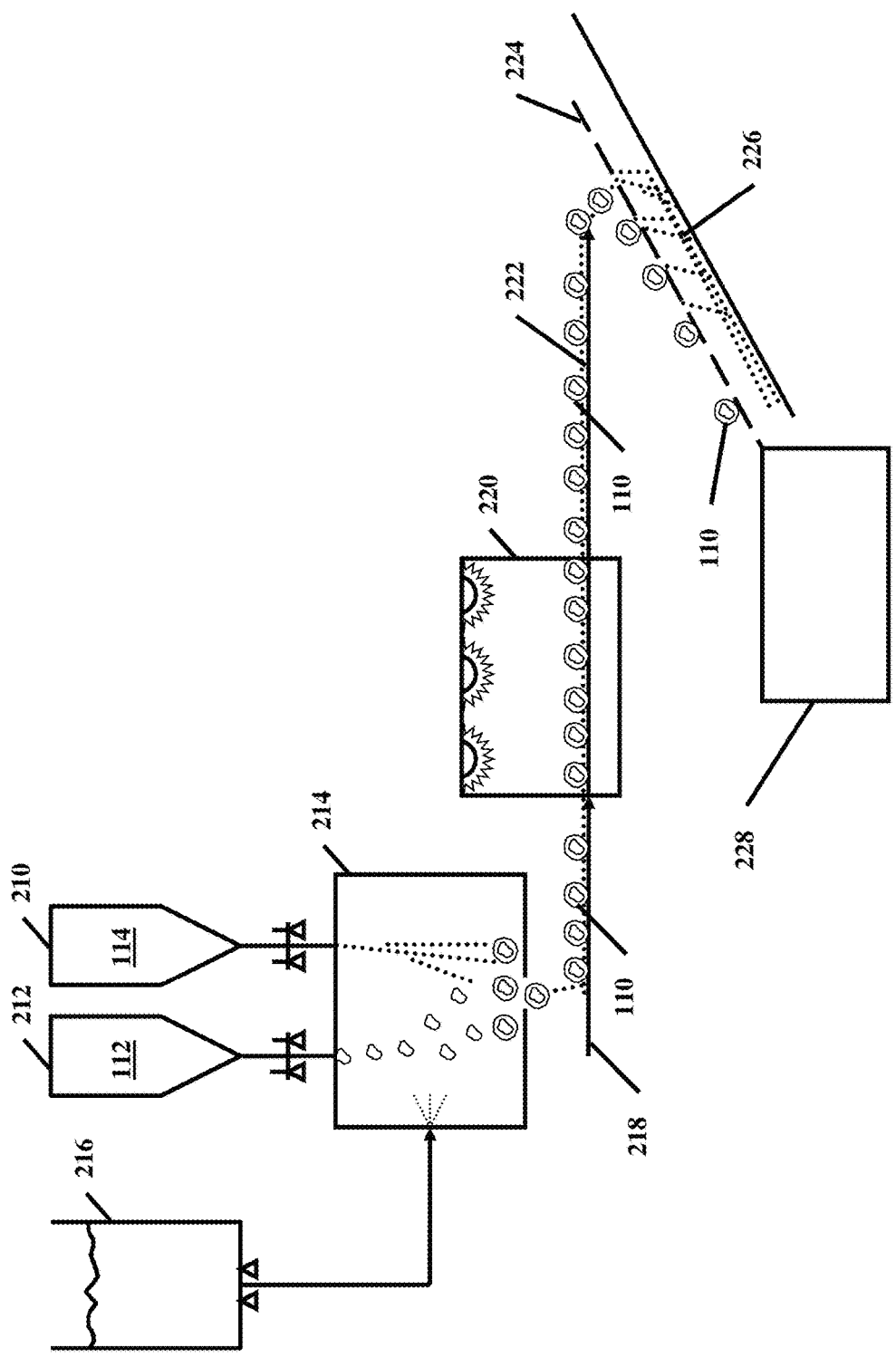
FIG. 2 illustrates a method of forming the particle of FIG. 1, in accordance with one embodiment.

For example, with reference to FIG. 2, a cement source 210 and a substrate source 212 may provide cement 114 and substrate 112 respectively to a mixer 214. The cement source 210 and the substrate source 212 may each have continuous or batchwise dosing and feeding systems. The control of the mass flow can either be by weighing the cement 114 and the substrate 112 or by volumetric dosing of the cement 114 and the substrate 112. As illustrated, the cement source 210 and the substrate source 212 may each include hoppers, conveyor belts, air pushing and/or manual feed mechanisms, with corresponding controls to allow for precise adjustment of the ratio between the substrate 112 and the cement 114 moving into the mixer 214. The substrate 112 may undergo a pre-sieving or other process after ore is mined from the earth to provide a particularly specified size and/or distribution parameter. Such process may involve washing, hydro-sizing, drying via natural gas or otherwise, sorting the resulting dry substrate 112, storing, and/or shipping the substrate 112 to the location where it will be introduced to the cement 114.

The mixer 214 may include a concrete free fall mixer, a rotating drum, a tank, a rotary or other pelletizer, a plough mixer, rotary drum, pan pelletizer, high shear mixer, low shear mixer, pin mixer, deep drum pelletizer, paddle mixer, agglomeration equipment, powder coating equipment, a self-cleaning concrete mixer, spray nozzles for fluid dosing, or any other container or equipment providing the ability to cause contact between the substrate 112, the cement 114, and a source of moisture in a manual and/or automatic fashion. A moisture source 216 may provide moisture to the cement 114 in the mixer 214. The moisture source 216 may be a tank or other vessel and the moisture may be water that is sprayed via nozzle, hose, pipe, or otherwise delivered to the mixer 214 in a manual and/or automatic fashion. The water may be fresh water suitable for the manufacture of concrete and/or mortar and not harmful for the hydration of the cement or cementitious material. The water may be dosed in the mixer 214 in a controlled way so as to provide a desired ratio between water and cement.

The mixture may include the additions of polymer fibers such as polyacrylamide, polyacrylate, guar gum, a guar derivative, polysaccharide, blends of polysaccharide and another hydrophilic polymer, polymers such as polypropylene, polyamide, polyimide, polyester, aramide, metals such as galvanized steel, stainless steel, bronze, brass, aluminum, glass with or without coating, carbon, quenched molten rock fibers (e.g., basalt), etc. to help increase the strength of future bonding to bonding particles and agglomeration of particles for suspension.

Exemplary ratios of the composition in the mixer 214 may include approximately 83% sand, 14% cement, and 2-4% water. Exemplary ranges may include 25-80% sand, 13-70% cement, and 3-15% water. Alternatively, ranges may include 50-70% sand, 25-50% cement, and 5-10% water. Upon contact with moisture (e.g., water), the cement 214 may begin initial hydration. This initial hydration may occur simultaneously with the mixing of the substrate 112 with the cement 114, such that the moistened cement 114 contacts and forms a layer on the substrate 112. Alternatively, the moisture may contact the cement 114 either before or after the cement 114 has come into contact with the substrate 112. The moisture, cement 114, and substrate 112 may be agitated in the mixer 214 for a set period of time adequate to provide the layer of cement 114 on the substrate 112, having the suitable thickness 116 and coverage ratio. For example, the initial hydration process may continue for at least 2 hours. Once the layer of cement 114 has formed on the substrate 112 creating the particle 110, the particle 110 may be removed from the mixer 214.

After the particle 110 is discharged from the mixer 214, the cement 114 on the substrate 112 may still be rather weak and easily damaged. The cement 114 may require some degree of hardening. Notably, the moisture present in the cement 114 may continue the process of hydration, even when additional moisture is not introduced. Thus, without further intervention, the cement 114 may continue the hydration process and harden. The amount of moisture present, the time of initial hydration, and the characteristics of the cement 114 and the substrate 112 may dictate the extent to which hydration and any corresponding hardening occur. Preferably, the cement 114 will undergo sufficient initial hydration to provide a stable particle 110 with the cement 114 having set enough to stick to the substrate 112. In order to ensure sufficient hydration, a conveyor 218 may be provided to allow for continued initial hydration until the cement 114 is set to the desired extent to provide the particle 110 with the desired characteristics. Additionally, or alternatively, temporary storage (not shown) may be provided to allow the cement 114 to harden to an extent. For example, the particles may be stored for 30 minutes to an hour, between an hour and 72 hours, or any time less than 72 hours before sufficient hydration has occurred. A cement accelerant, e.g., triethanolaminic calciumchloride, potassium chloride, sodium formate, sodium nitrate, and other alkali and alkaline earth metal halides, formates, nitrates, and carbonates or others), retardants (e.g., sodium tartrate, sodium citrate, sodium gluconate, sodium itaconate, tartaric acid, citric acid, gluconic acid, lignosulfonates, and synthetic polymers and copolymers, thixotropic additives, sugar, or others), suspending agents, or the like may also be in the mortar slurry, etc. may be added to the mixing and/or pumping process for faster hydration.

Once sufficient initial hydration has occurred, the particle 110 may be dehydrated (e.g., dried) before the cement 114 has substantially hardened. Such dehydrating may halt or at least slow hydration, such that the cement 114 of the particle 110 moves from a state of initial hydration to a state of suspended hydration, thus preventing the particle 110 from becoming nonreactive in the further presence of moisture. Various methods of dehydration may include application of chemicals such as acetone or alcohol, flow of a dry gas (e.g., air), and/or the application of heat. In the embodiment illustrated, such drying may begin to occur on the conveyor 218 or in storage, and may continue in a dryer. The dryer 220 may remove a significant amount of moisture from the cement 114 of the particle 110 via evaporation (e.g., through the application of heat or flow of dry air). For instance, the dryer 220 may be a flame dryer, a fluidized bed dryer, a rotating drum dryer, or other heating equipment or heat cycling apparatus. In one example, the dryer 220 may heat the particle 110 at a temperature of 100° C. to 150° C. for 3 to 30 minutes. In another example, the dryer 220 may heat the particle at a temperature of 80° C. to 170° C. for 5 to 20 minutes. Alternatively, drying may involve introduction of chemicals such as alcohols, silicate gels, acetones, glycols, internal olefins, or other compositions. It is thought that the moisture content of the particle 110 prior to drying may be up to 15% water. Preferably, the moisture content of the particle 110 will be reduced to 2% or less via drying. For example, the moisture content of the particle 110 after drying may range from 0.5 to 5%. In some embodiments, a moisture content of less than 1% may be achieved. Once sufficient moisture has been removed, the cement 114 of the particle 110 may enter a state of suspended hydration and further hydration may not occur without the introduction of additional moisture. If the dryer 220 has used heat, the particle 110 may be cooled on conveyer 222 as the particle 210 passes to additional processing stages.

Once the particle 110 has been dried and optionally cooled, the particle 110 may then undergo a sieving process to remove any excess loose cement and/or any oversized clusters formed by the joining of particles 110. Some particles 110 that have joined may still have a desirable size and may be maintained while other clusters may be deemed too large and thus undesirable. The sieving process may involve the passage of multiple particles 110 and other effluents from the dryer 220 over one or more sieves. Thus, the material from the dryer 220 may pass over a sieve 224 to separate dust or particles having unsuitable size 226 from the particle 110 having the desired characteristics. In one example, the sieve 224 may include a 20 mesh sieve to isolate one size of particle 110 and the material passing through the 20 mesh sieve may be exposed to a 40 mesh sieve to isolate another size of particle or material. Other sizes and combinations of sieves may be provided, depending on the particular application. Sieving may involve mechanical sieving, cyclones, orbital sieving, incline shakers, multiple parallel sieving, etc.

Once cooled and optionally sorted or isolated, the particle 110 may then move to a storage receptacle 228, for example, via a conveyor belt. The storage receptacle 228 may be used for long or short term storage and may, in some instances, also be used for transport. Some exemplary storage and/or transport receptacles include a moisture-proof container, a bag kept away from moisture sources, a truck, a super sack, a sand hauler, a belly dome trailer, a rail car, a cement tanker, a boat container or deck, an air freight container, a free fall mixer, an open covered area, a silo, a warehouse, a mountain mover, or any other storage container or location where the particle 110 may be shielded from moisture. The storage receptacle 228 may be substantially devoid of moisture or may contain fluids that inhibit cement hydration such as oils or other chemicals. Transport of the particle 110 to or from the storage receptacle 228 may involve pneumatic, conveyor belt, or other systems commonly used to transport dry materials. Handling may occur in a climate controlled environment, and loading may be done as cold product loading with desiccant bags, air vents, plastic covers, or other similar protections in place.

So long as the particle 110 is protected from moisture with a tendency to react with cement, the cement 114 of the particle 110 may remain in a state of suspended hydration. For example, hydration may be targeted at 40% to maintain integrity of the cement layer, leaving the cement 114 with 60% that has not yet been spent but remains ready for secondary hydration. While the cement 114 is in a state of suspended hydration, the particles 110 may have the appearance of a dry sand-like material.

In an alternate embodiment (not illustrated), particles 110 may be formed via polymer dispersion. A fine dispersion of a thermoplastic polymer in water may be applied in a thin layer on the substrate 112 by spraying, using a pelletizing table, or other method. Dry cement may then be added and the thickness 116 of the cement 114 may be approximately half the average diameter of the particle 110. In some embodiments, a bottom portion (e.g., bottom half) of the particle 110 is immersed in a thin layer of polymer dispersion such that the cement 114 reacts with the water in the dispersion. In such configuration a top portion (e.g., top half) of the particle 110 would remain dry, resulting in the cement 114 of that portion also remaining dry. The reacting cement may create a strong anchoring of the cement 114 to the substrate 112. By utilizing an appropriate film forming temperature of the polymer dispersion will, resulting particles 110 may for a solid and partly elastic glue of the cement layer to the substrate.

After some time in storage, the particle 110 may be utilized. The time in storage may be as short as the time of transport between the site where the particle 110 was created and a job site. For example, the particle 110 may be created at a central facility used to upgrade raw materials and be immediately transported to a well site. Alternatively, the time in storage may be a period of hours, days, weeks, months, or even years. In some instances, there may be limited or no time in storage. For example, the manufacture of the particle 110 may occur at the site of expected use (e.g., the well site) and used immediately. Regardless of the time in storage, the cement 114 of the particle 110 may have remained in a state of suspended hydration until use is desired. The particle 110 may be used in any of a number of ways, including in subterranean operations, construction projects, etc. When the particle 110 is intended for use as a component of a structure, a method of using the particle 110 may involve combining the particle 110 with other like particles and providing moisture to re-initiate hydration of the cement 114, such that the cement 114 enters a state of secondary hydration.

Figure 3:
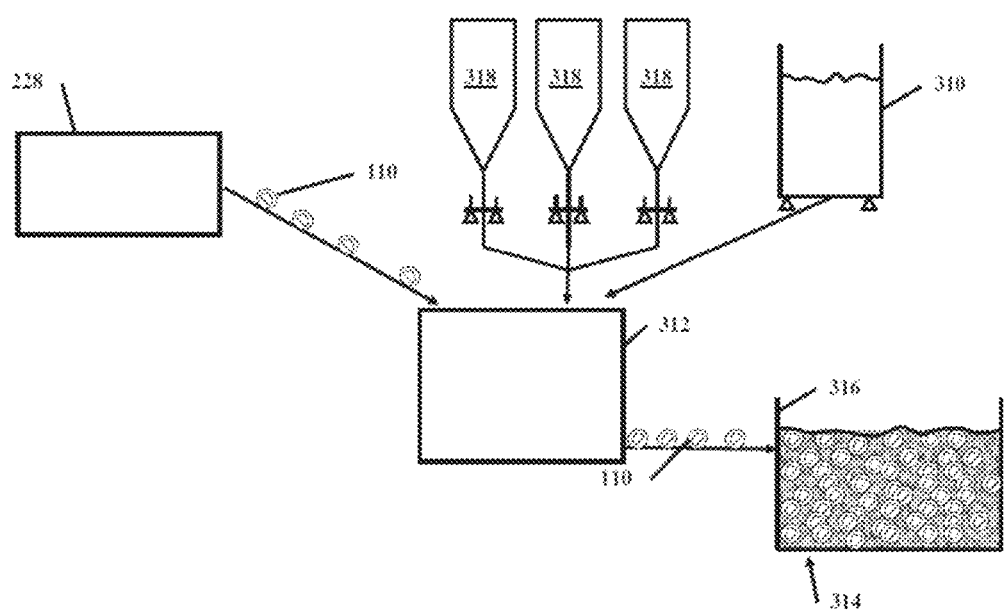
FIG. 3 illustrates a method of forming an agglomerated matrix including the particle of FIG. 1, in accordance with one embodiment.

Referring now to FIG. 3, the particles 110 may be removed from the storage receptacle 228 or otherwise provided to the site of use. Moisture may be provided at the site of use, for example, from a secondary moisture source 310. Additives 318 may also be provided at any point in the process. Additives may include accelerants, retarders, plasticizers, surfactants, weighting agents, thickening agents, hydrophobic coating, hydrophilic coating, pH buffers, fillers, such as limestone, microfibers to enhance strength, etc. More specifically additives may include any of the following: calcium chloride, sodium chloride, potassium chloride, calcium nitrite, calcium nitrate, calcium formate, sodium formate, triethanolamine, X-seed (BASF), nano-$CaCO_3$, sugar based admixtures (lignine, etc.), carbohydrate derivates, soluble zinc or leads salts, soluble borates, soluble phosphates, calcium lignosulphonate, admixtures specified in ASTM C494, gypsum, calcium sulfoaluminate, free lime, metallic aluminum, reactive silica, clinker, fly ash, slag, silica fume, limestone, burnt shale, pozzolan, HEC, XL, guar, general polysaccharides and cellulose, friction reducers, brines, biocides, gel breakers and breaker schedule, etc. Additives may be mixed with each other and/or with the particles 110 and/or with the moisture. Such mixing may occur onsite as illustrated, offsite, in batches, continuously, semi-batch, or otherwise as will be appreciated by those skilled in the art.

The moisture may be allowed to contact the particles 110, e.g., in a mixer 312. The particles 110 may be allowed to contact one another before the cement 114 thereon has substantially hardened. Such contact between the particles 110 may occur either before, during, or after the introduction of moisture, so long as the cement 114 has not substantially hardened prior to contact between the particles 110. Thus, in the embodiment of FIG. 3, the particles 110 and the moisture are provided in the mixer 312. The particles 110 may then exit the mixer 312 while the cement 114 thereon is undergoing secondary hydration. The particles 110 may then contact one another in a subterranean formation, in a form 316 constructed to provide a shape, or in another manner. The contact between the particles 110 may be maintained while the cement 114 is allowed to substantially harden. Thus, the hardening of the cement 114 may cause the particles 110 to bond together, forming an agglomerated matrix 314. If the particles 110 were in the form 316, the form 316 may then be removed as desired. Notably, while FIG. 3 shows the mixer 312 between the storage receptacle 228 and the form 316, the particles 110 could be placed directly in the form 316 and the moisture could be introduced directly from the secondary moisture source 310 to the form 316 with the end result of the agglomerated matrix 314 being the same, even absent the mixer 316.

Figure 4:
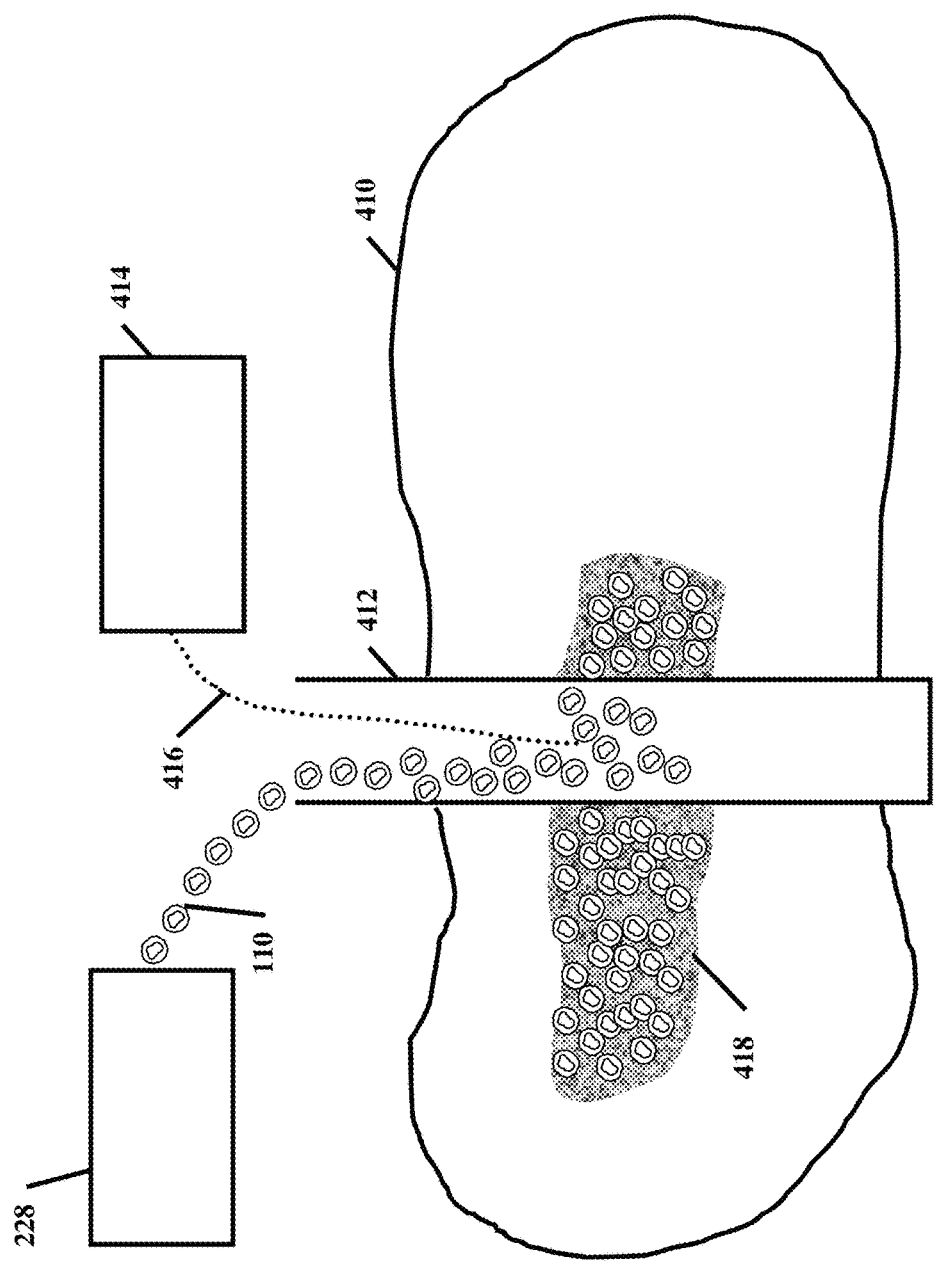
FIG. 4 illustrates a method of treating a subterranean formation using the particle of FIG. 1, in accordance with one embodiment.

Referring now to FIG. 4, the particles 110 may be used in a manner similar to that described above, but instead of in a form, the particles 110, with the cement 214 thereon still in a state of suspended hydration, may be used to treat a subterranean formation 410 through a well bore 412. The particles 110 may be provided at the site, e.g., via storage receptacle 228. The particles 110 may then be introduced to the subterranean formation 410 via the well bore 412. Moisture, for example, in the form of water 416 from a tank 414, may also be introduced to the subterranean formation 410 via the well bore 412. Introducing the particles 110 and introducing the water 416 to the subterranean formation 410 via the well bore 412 may be by any of a number of methods. For example, the particles 110 may be combined with a carrier, such as the water 416, a brine, a gel, or other fluids to enhance flowability, and the fluid and particles 110 may be pumped into the well bore 412. Alternatively, the particles 110 may flow without any such fluid addition and may be pumped directly into the well bore 412. Further, the particles 110 and the water 416 may be introduced to the subterranean formation 410 via the well bore 412 either as a mixture, or separately. In other words, the particles 110 may be mixed with the water 416 prior to introducing the particles 110 or the water 416 to the subterranean formation 410. For example, a mixture such as that shown leaving the mixer 312 of FIG. 3 may deliver both the water 416 and the particles 110 to the well bore 412 for delivery into the subterranean formation 410 after both the particles 110 and the water 416 were placed in the mixer 312 and mixed to form a slurry. In some instances, the mixture leaving the mixer 312, or particles 110 in which the cement 114 is otherwise experiencing secondary hydration, may be stored for a limited time (e.g., up to an hour). Introducing the particles 110 and the water 416 may occur simultaneously, whether the two have been mixed prior to entry into the well bore 412 or not. Further, additives, such as those described with respect to FIG. 3, may be included at any point in the process. Regardless of the point at which the additives contact the other components, the additives may be introduced to the subterranean formation 410 via the well bore 412, e.g., along with a mixture of the particles 110 and the water 416 or simultaneous with but separate from such a mixture.

Water 416 could, in this embodiment, also contain other chemicals or additives. Such chemicals or additive could include, for example, components that act as buffers to pH. Providing pH buffers could help prevent changes in pH that could cause precipitation of other ions which may have solubility that are sensitive to pH.

At some point, the particles 110 and the water 416 may be allowed to contact one another. Such contact may occur before, during, or after the particles 110 and the water 416 are in place in the subterranean formation 410. Contact between the particles 110 and the water 416 may cause the cement 114 on the particles 110 to move from a state of suspended hydration to a state of secondary hydration. Thus, the particles 110 may be sticky or otherwise amenable to bond to one another. The state of secondary hydration may occur when the particles 110 and the water 416 touch directly, or secondary hydration may begin as water 416 is drawn into voids between particles 110. Direct contact between the particles 110 and the water 416 may not be necessary, so long as there is sufficient interaction between the particles 110 and the water 416 to expose the cement 114 to sufficient water to cause hydration to resume. This secondary hydration may be allowed to continue until the cement 114 of the particles 110 has bonded the particles 110 together, whether completely hardened or not. Thus, the particles 110 may act as a proppant even before being fully hydrated.

Particles 110 may be circulated with water at temperature controlled (cooled or heated) to initiate or retard the cement reaction to further control the time for sticky behavior in the formation. Additives to the carrier fluid may be added before, after or in combinations of the fluids in concentrated, diluted or desired concentrations in a single or multiple steps. This is to adapt to equipment availabilities such as hydration units, residence tank, batch or continuous mode and at different logistical environments such as weather (arctic, swamp, onshore, dessert, lake, canal or sea) and oil and gas type of activity such as exploration, appraisal, development or redevelopment which influences process set ups.

During secondary hydration, contact between the particles 110 before the cement 114 thereon has substantially hardened, and maintenance of such contact while the cement 114 substantially hardens may result in the hardening of the cement 114 causing the particles 110 to bond together, to the formation, and to the well bore including cement layer up to inside of the well to form a fracturing grout or agglomerated matrix 418 in the subterranean formation 410.

During secondary hydration, maintenance of contact between the particles 110 and the water 416 while the cement 114 substantially hardens may allow for full hydration of the cement 114 and provide individual particles 110 and/or the agglomerated matrix 418 having desirable characteristics. For example, characteristics may include solid like properties, physical integrity, chemical compatibility to the formation and hydrocarbons, millable inside the well, permeability higher than the formation to substrate material, etc. It is noted that individual particles 110 may be exposed to the water 416 without being exposed to other individual particles. Thus, a plurality of particles 110 may enter the well bore 412 and be fully hydrated separately, never forming the agglomerated matrix 418. However, for most applications, it is thought that the particles 110 will contact one another to form a structure where the cement 114 from one particle 110 bonds chemically with the cement 1114 from another particle 110.

Notably, during initial hydration, the cement 114 may have set and may have even hardened to a degree. However, when entering a state of suspended hydration, the hardening of the cement 114 may have been stalled such that only partially hardening occurred prior to secondary hydration. Then, when the secondary hydration starts, additional hardening may occur and be allowed to continue for a period of minutes, hours, days, or longer, until the cement 114 has substantially hardened and provides the desired characteristics.

When the method of treating a subterranean formation involves fracturing, certain steps may precede or follow the introduction of the particles 110 into the subterranean formation 410. Thus, before introducing the particles 110 and introducing the water 416, a fracture may be created in the formation 410, near the well bore 412. Then, the introduction of the particles 110 into the formation 410 may involve introducing the particles 110 into the fracture. Likewise, the introduction of water 416 into the formation 410 may involve introducing the water 416 into the fracture. Once the water 416 reacts with the particles 110 in the fracture, the particles 110 may provide support to the formation. If multiple particles 110 bonded together, an agglomerated matrix may form within the fracture and provide support. Once the particles 110 are providing support to the formation, whether part of the agglomerated matrix or acting individually, a hydrocarbon may be produced from the subterranean formation 410 via the well bore 412 while the particles 110 continue to provide support.

When particles 110 are used in fractures, the particles could be used in combination with uncoated proppant particles. Utilization of a mixture of uncoated proppants and particles 110 may reduce the cost of material needed for a particular fracture, and could result in a propped fracture with greater permeability.

The processing of the substrate 112 and the cement 114 to provide a particle 110 with the cement in a state of suspended hydration may be done in a continuous process on site, or a batch wise process in which the particles 110 are produced off site and the slurrifying is done on site. It is thought that off-site batch wise production may be more practical, given the type of equipment typically available on site. However, a batch wise and/or a continuous process on site may also be feasible with appropriate modifications.

When used as a proppant, the particles 110 may be pumped in a combination of stages with conventional proppants to achieve an optimum economical approach. For example, sticking to the surface velocity may be possible while achieving, for example, taller propped fractures by first pumping 90% of the total volume of conventional proppant to fill the bottom of the fracture and followed with 10% volume of particles 110 described herein at the end to bridge to the fracture and fill the top of the fracture. Various other ratios and methods may be employed depending on various factors such as well landing depths, location of the perforations, fracture thickness and type of fluid used. For example, one application may use 80% conventional proppant and 20% particles 110 formed with cement or vice versa. Other combinations may have a 70% to 30% split, a 60% to 40% split, or a 50% to 50% split of conventional proppant to particles 110. In some geologies it may be favorable to first pump particles 110 having cement 114 to achieve better propped heights if there are fracture thus reversing the order of the pumping. In other circumstances this pairings of particles 110 and conventional proppants may be pumped in more than a single series, such as 3, 7 or 10 series depending on the design and in concentrations ranging 0.5 ppg to 10 ppg, 1 to 9 ppg, 2 to 8 ppg or 3 to 7 ppg. Depending on the application, particles 110 may be separated by size, weight, or otherwise. Larger size distributions may be pumped in the beginning of a job at low concentrations.

In another embodiment of the present invention, after the cement 114 has hardened, or reached a secondary hydration, in the formation 410 to form the agglomerated matrix 418, the fracture could be exposed one more time to a pressure pulse of fluid sufficient to further open the fracture, and provide additional cracks in the agglomerated matrix and/or debond the agglomerated matrix from the rock face of the fracture. After the pulse of pressure, the cracked agglomerated matrix could exhibit additional permeability yet remain sufficiently agglomerated to provide the advantages of the present invention.

The length in time for the pulse of pressure provided in this embodiment of the invention could be long enough for the higher pressure to reach the full length of the propped fracture. The pulse of pressure could be applied at any time in the life of the well, including both before hydrocarbon flow has commenced, or later after hydrocarbon flow has already been established.

The fluid utilized to provide the pressure pulse in this embodiment of the invention could be water, fracturing fluid, a hydrocarbon-based fluid, or a gas such as nitrogen or methane. Using a gas such as nitrogen or methane might avoid placement of additional solids and/or liquids within the agglomerated matrix and the formation near the face of the fractures, and thereby avoid any detrimental effects resulting from the pulse. The use of a gas would require that the well head be able to contain pressures sufficient for the fracture to be opened without the aid of the additional hydraulic head provided by a liquid in the wellbore. If a liquid is required as the fluid for the pulse, the liquid could be a proppant-containing liquid so that additional proppant is also inserted into newly formed cracks in the agglomerated matrix, or between the rock face of the fracture and the agglomerated matrix.

It is thought that the teachings herein may provide a number of advantages, including but not limited to the following. Well spacing may be increased by as much as 100%, thus reducing the number of wells in a given field by as much as 50% through better placement given the stickiness of the cement coated grains. In thick formations, propped fracture height may also increase due to the stickiness of the particles, thus preventing settling and increasing production by as much as 100% or any combination of results with improved length. Another potential advantage is cost reduction. This system may allow the use of low cost non proppant quality sand (e.g., poorly sorted, angular, chemically unstable, and/or not strong enough) as proppant because the cement coated grain used as a proppant material may compensate for substrate deficiencies, thus reducing costs (30 to 50%, 40 to 60% or 50 to 80% or 70 to 95%) by significant order of magnitude compared to local and/or imported traditional sources. Further, mixed angularities of particles 110 resulting from corresponding angularity of the corresponding substrates 112 may create better packing mixtures. The cement layer may create particle bonding similar to resin layers but with greater strength and at a lower cost (e.g., a reduction of 50%, a reduction of 70%, or a reduction of 90%). Water efficiency (water use to extract a volume of hydrocarbons) given better proppant placement properties may be reduced by as much as 75%. The cost for treating flow-back water, (or water and fracturing fluids carried back into the wellbore by initial production) may be reduced because with the coated substrate of the present invention, because higher salinity water may be recycled and used in the present process without causing an incompatibility to the system. These advantages may occur for a variety of reasons. Currently, in unconventional hydrocarbon production, hydraulic fracturing has better performance using water instead of gels. However, hydraulic fracturing with water has limited transport capability for conventional proppants. Using the combination of the particles 110 with water as a fracturing fluid may allow for the secondary hydration to result from contact between the particles 110 and the fracturing fluid without additional water for hydration. Further, it is thought that as the fracturing fluid enters a portion of the formation, the particles 110 carried therein will also enter that portion of the formation and, as the cement 114 on those particles hydrates, the particles 110 can provide support to any fractures formed, by the fracturing fluid, in that portion of the formation. Use of coated particles 110 as proppants for fracturing may also prevent the proppant from being carried back into the wellbore by flowback with initial production, such as resin coated sands are occasionally used presently.

The source of moisture described above has included water. Such water for hydration may be in the form of droplets in air, liquid water, a brine, formation water, new, recycle, or waste stream (e.g., sea water, pond, river, lake, creak, glacier, melted ice or snow, flow back water, sewer, brackish water, etc.). Furthermore, moisture may be provided without the use of water. Likewise, the slurry pumped downhole may or may not include water. Other alternatives which might be used in conjunction with water, or as a replacement to water include thick fluids and gels.

The description has primarily referred to the use of the particle 110 as a proppant in fracturing fluid. When used in fracturing fluid, the particle 110 may have size in ranges from 20/40, 30/50 and 40/70 US Mesh size. For application as proppant in fracturing fluids, narrow ranges of particle size are desirable. Particle size selection may be related to the type of carrier fluid using for fracturing and the width of the fracture created while pumping plus the amount of conductivity need to good fracture flow. In general particle permeability may be higher than (10×Formation Perm× Fracture Half Length)/(Propped Width). However, any of a number of applications may be well-suited for the particle 110 as described herein. For example, the particle 110 may be used in sand control and/or gravel pack. When used in sand control or gravel pack, the size selection of the particle 110 may be tied to the grain size distribution of the formation in which sand control is used. For example, by applying Saucier criteria: minimum particle size is 3×D50; and maximum particle size is 6×D50; where D50: average weighted formation size distribution. The particles 110 may be placed either in an open hole or a cased hole completion using standard gravel pack equipment, the particles 110 may be conveyed to the well bore with gelled water at either low and high viscosities, depending on factors such as sand control length, well depth, temperature, annular space, etc. Concentration of particles in pounds per gallon of fluid may vary from 2 to 12.

In another example, the particle 110 may be used in drilling mud as a fluid loss additive. The particles 100 with reactive cements and active stickiness behavior may be pumped to adhere to a location with severe fluid loss. Contrary to hydraulic fracturing where permeability through the pack is required, in this application a low permeability is desirable. Such low permeability may be accomplished by having a wide range with even distribution of particle size. For example, sizes 100 to 50 mesh, 70 to 30 mesh, or 50 to 10 mesh. When used in drilling mud, the particle 110 may, with the right size distributions to be low permeability, be pumped as a loss control material.

In case of weak wellbore section, the particles 110 may be used to fill the section to maintain integrity while assuring good well bore to formation communication due to the high permeability of the cement. Thus, the particles 110 may stabilize the formation while retaining communication.

In injector wells for water, other liquids like polymer water, gas or steam for enhanced oil recovery or disposal) may provide a better injection surface in the annular space between casing and open hole in cemented completions. At the locations with these grains and perforations are created, fluid may percolate to the rest of the formation phase. The particles 110 may also be used to focus the injection into more specific areas with variable size of particles 110. In completions with external casing packers for open hole type of communication and fracture initiations, the annular space can be filled with the particles 110 to provide additional load support (less than the external casing packer) but still permit pre-determined percolation of injection.

The particles 110 may improve injection to reduce near wellbore friction in stimulation operations. In cemented plug and perforation operations, the use of the particles 110 behind casing in the production section may improve breakdown pressures as in the case of injector wells (water and gas for enhanced oil recovery or disposal) and may provide a better injection surface when perforated as fluid may percolate to the rest of the formation phase. The particles 110 may also be used to focus the injection into more specific areas with variable size of particles 110. In completions with external casing packers for open hole type of communication and fracture initiations, the annulus can be filled with the particles 110 to provide additional load support (less than the external casing packer) but still permit percolation of injection.

The particles 110 may be used as a liner. Instead of running a cemented liner in an open hole, a section of interest may be filled with the particles 110 and letter re-drilled, thus reducing or eliminating the cost of pipe and cementing operation. This section can serve as a production, injection and/or monitoring conduit or to sustain hole opening. With the correct phasing and placement of sealing cement, it can also provide isolation.

The particles 110 may be used to regulate loss of water in high permeability zones, in lieu of polymers. For example, the non-controlled water shut off may be achieved by combining permeable cement stage followed with sealing and heavier cement pumped first to seal water from bottom. Such method may be lower cost compared to packers for water shut off with multistage cementing. Where hydraulic fracturing can break to a formation below that is water bearing and generate unnecessary water production, preceding the introducing the particles 110 with a sealable cement that will settle to the bottom may be a solution to the problem. The non permeable cement may be pumped first to isolate water producing zones followed by particles 110 that may allow hydrocarbon producing zones to flow.

The particles 110 may be used as a pre-mixed dry mortar, as an injection material for large cracks or gaps, as permeable or non permeable foundation for roads, sport field, playing ground, buildings, as half product for onsite manufacture of building materials especially in rural areas, as filter material, or any of a number of other uses in industry or otherwise. The particles 110 may be used in concrete used in construction of buildings or roads or drainage structures or ground footings or other structures.

Some particles may not include a substrate and a layer of cement but may instead be formed entirely of cement. Such particles may be manufactured by pelletizing cement. Such pellets may increase water absorption, allowing for better fracture cleanup and permeability.

While the description above refers primarily to use of particles where the cement is in a state of suspended hydration for at least some time, other embodiments might allow for omission of the step of suspending hydration. In such embodiments, particles may still be coated with cement, but hydration may occur until the cement is no longer reactive in the presence of additional moisture (i.e., in a state of full hydration). Such fully hydrated particles may be used in place of any of the particles described above. Thus stopping hydration may either involve drying a particle so as to cause it to enter a state of suspended hydration or allowing the cement to become fully hydrated. In either event, hydration may stop (either temporarily or permanently) before the particle is placed in a load-bearing location such as the well bore mentioned above, or any other application where such particles may be useful (e.g., roads, bridges, dams, construction, etc.). Fully hydrated particles may have many of the benefits described above, including roundness, strength, and lower cost as compared to conventional proppants such as proppant-grade sand.

For purposes of this disclosure, cement is deemed "set" when it is able to maintain shape without external support. Set cement may still be malleable until sufficient hydration has occurred to prevent manipulation without breakage. Likewise, for purposes of this disclosure, cement is deemed "hardened" when it has reached a final load-bearing capacity. As hydration continues for quite a long time, fully hardened cement is rare. Thus, the term "substantially hardened" is used to refer to cement that has reached a predetermined design load-bearing capacity. The term "suspended hydration" generally refers to a condition in which the cement has started the hydration process but is not reacting because of a lack of available moisture. The term "fully hydrated" generally refers to a condition in which the cement has started the hydration process and has continued until it is no longer reactive to moisture.

Those of skill in the art will appreciate that many modifications and variations are possible in terms of the disclosed embodiments, configurations, materials, and methods without departing from their scope. Accordingly, the scope of the claims and their functional equivalents should not be limited by the particular embodiments described and illustrated, as these are merely exemplary in nature and elements described separately may be optionally combined.

We claim:

1. A method of treating a subterranean formation via well bore, the method comprising:
   introducing a plurality of particles into the subterranean formation via the well bore, each particle comprising a substrate and a layer of cement on the substrate;
   wherein the cement is in a state of suspended hydration.

2. The method of claim 1 further including:
   introducing moisture to the subterranean formation via the well bore; and
   allowing the particles and the moisture to contact one another;
   wherein the contact between the particles and the moisture causes the cement to move from a state of suspended hydration to a state of secondary hydration.

3. The method of claim 2, wherein introducing the particles and introducing the moisture occurs simultaneously.

4. The method of claim 2 wherein the introducing the plurality of particles into the subterranean formation via the well bore comprises introducing the plurality of particles into a fracture within the subterranean formation by introducing the plurality of particles into the subterranean formation at a pressure which exceeds a pressure causing fractures, and maintaining such pressure until the state of secondary hydration is reached.

5. The method of claim 4 wherein the plurality of particles is combined with uncoated proppant.

6. The method of claim 2, comprising:
creating a fracture in the subterranean formation near the well bore before introducing the particles and introducing the moisture, wherein introducing the particles comprises introducing the particles into the fracture, and wherein introducing the moisture comprises introducing the moisture into the fracture; and
producing a hydrocarbon from the subterranean formation via the well bore; wherein the particles provide support to the formation during the producing.

7. The method of claim 1, comprising:
creating a fracture in the subterranean formation near the well bore before introducing the particles, wherein introducing the particles comprises introducing the particles into the fracture; and
producing a hydrocarbon from the subterranean formation via the well bore; wherein the particles provide support to the formation during the producing.

8. The method of claim 1, comprising introducing additives to the subterranean formation via the well bore.

* * * * *